Sept. 26, 1950   J. T. ATWOOD ET AL   2,523,268
CLOTHESLINE REEL
Filed Feb. 23, 1946   2 Sheets-Sheet 1
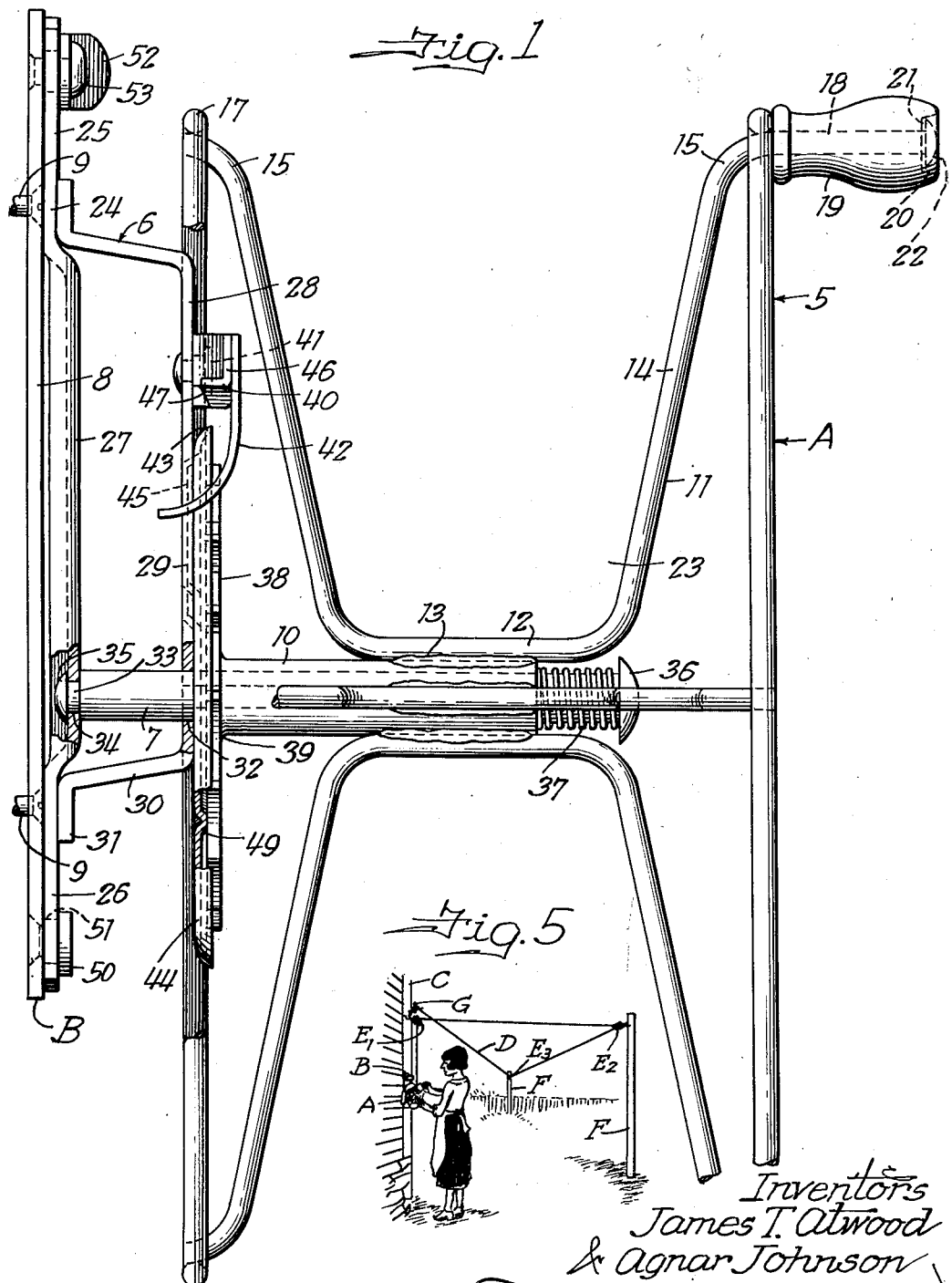
Inventors
James T. Atwood
& Agnar Johnson
Andrew F. Winter
atty.

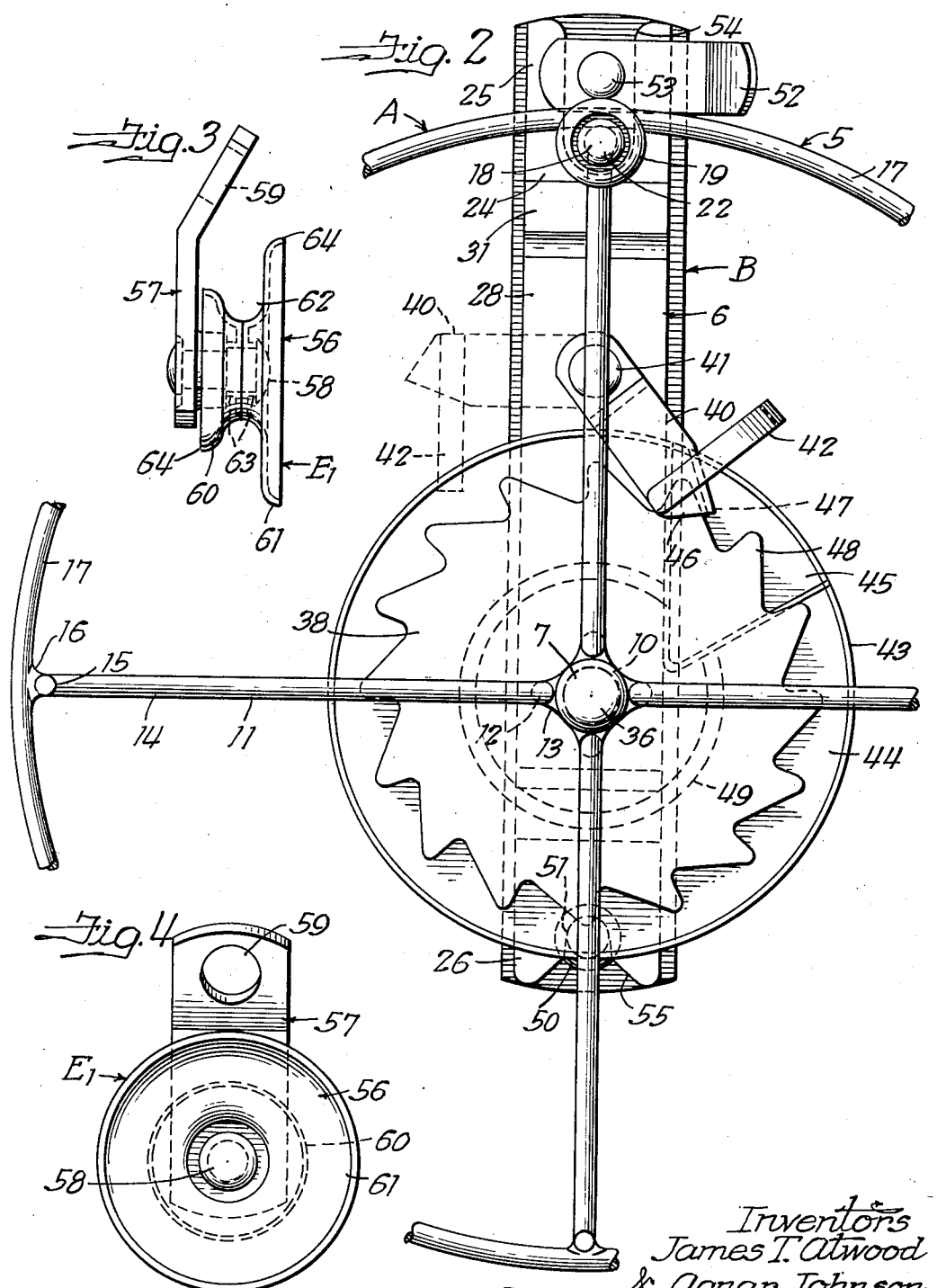

Patented Sept. 26, 1950

2,523,268

UNITED STATES PATENT OFFICE 2,523,268

CLOTHESLINE REEL

James T. Atwood and Agnar Johnson, Rockford, Ill., assignors to The Atwood Vacuum Machine Company, Rockford, Ill., a copartnership composed of Seth B. Atwood and James T. Atwood Application February 23, 1946, Serial No. 649,568

20 Claims. (Cl. 242—100)

1

This invention relates to a new and improved clothes line reel.

The principal object of our invention is to provide a clothes line reel which is designed to be mounted detachably on a fixed support so that the reel may be kept indoors with the line wound thereon and be put up on the support only when the line is to be used, the line being first pulled from the reel and strung from post to post over open faced pulleys and attached at its free end to a hook, after which the reel is used as a winch to take up slack in the line and place it under a desired tension. In taking the line down, the reel is removed from its support and the line is wound on the reel while walking from pulley to pulley with the reel, so that there is no danger of the line dragging on the ground and getting soiled.

The reel of our invention embodies the following novel features:

1. The drum onto which the line is wound is of wire construction, U-shaped wires forming spokes and being welded by their cross-portions to a tubular hub member and at the outer ends of their arms to wire rings forming the rims of the drum, and one of the spokes having the end of one arm thereof extended outwardly in a plane at right angles to the adjacent rim to form a spindle for attachment of a handle.

2. The handle bracket on which the drum is mounted for rotation has an axle extending through the hub of the drum and carrying a coiled compression spring on the projecting end of the axle which helps to place a slight frictional drag on the turning of the drum to avoid the likelihood of the drum spinning in the paying out of line and accordingly eliminates likelihood of the line dragging on the ground. The spring is preferably enclosed in the hub structure.

3. A hand grip is formed as a part of an attaching plate on the handle bracket and the ends of the attaching plate are slotted for quickly detachable connections with a supporting plate, which has a stud on one end to enter one of the slots and a turn-button on the other end adapted to pass through the other slot and be turned to fasten the reel quickly and securely.

4. A ratchet wheel welded to one end of the tubular hub cooperates with a gravity type pawl that is pivoted on the handle bracket to permit releasably locking the drum in any position of rotary adjustment when tightening the line, the pawl being, however, swingable to a retracted position when the drum is to turn freely as when paying out the line.

5. A guard disk is provided on the handle

2 bracket behind the ratchet wheel to avoid any likelihood of the operator extending a finger where it might be struck and cut or scratched by the teeth of the ratchet wheel, this disk having one segmental portion thereof bent out of the way to allow free access to the ratchet wheel for the pawl, and the pawl having a laterally extending finger which in the retracted position of the pawl rests on the rim of the guard disk. A rib projecting from the guard disk and rubbing against the back of the ratchet wheel as a result of the pressure of the coiled compression spring previously mentioned, accounts for the light frictional drag resisting turning of the drum.

In the accompanying drawings illustrating the invention:

Figs. 1 and 2 are two views of the reel made in accordance with our invention, a portion of the one rim being broken away in Fig. 1 to enable better illustration, and portions of both rims being broken away in Fig. 2 to conserve space and enable showing the reel on a larger scale, and the drum locking pawl on which the curved finger is attached being shown in retracted position in Fig. 1, corresponding to the dotted line position shown in Fig. 2;

Figs. 3 and 4 are two views of a pulley made in accordance with our invention, and Fig. 5 is a pictorial illustration showing how the reel and pulleys are used.

The same reference numerals are applied to corresponding parts throughout the views.

Referring first to Fig. 5, the reel is indicated at A detachably mounted on a support or fixture B that is provided on the side of the house C. The line D, which is wound on the reel A, extends from the reel on the support B and is strung over a number of open-faced pulleys E1, E2 and E3, some of which are hung on hooks or eyelets on posts F at convenient places around the yard, and the free end of the line is attached to a hook G, preferably located near the reel fixture B. Thus, after the reel A has been fastened to the support or fixture B the line is tossed over the first open-faced pulley E1 and payed out from the reel by walking with the end of the line to the other pulleys E2 and E3, in order, the line being tossed over these pulleys in like manner and the end being finally brought back to the house and fastened to the hook G. It is important in this stringing up of the line that the reel A be kept from turning too easily, because that would permit the line to drag on the ground. As will soon appear, there is a friction drag which prevents the reel from spinning. The housewife or laundress after putting up the line steps to the reel A and turns the pawl (hereinafter numbered 40) to operative position and then turns the reel to take up the slack in the line and tighten it. If the line thereafter sags under the weight of the clothes it can be tightened again by means of the reel A. To take the line down, the pawl is first released to relieve the tension in the line and the reel A is removed from the fixture B and then the line is wound up while walking with the reel from pulley to pulley. As will soon appear, the pulleys E1—E3 are rust proofed and can be left on their hooks or not as desired.

Referring now to Figs. 1 and 2, the clothes line reel A comprises a drum 5 of wire construction, and a handle bracket 6 of sheet metal construction carrying an axle 7 on which the drum 5 is rotatably mounted. The supporting fixture B consists of a plate 8 onto which the handle bracket 6 is designed to be detachably secured, the plate 8 being suitably secured to a post or building, as by screws 9. The drum 5 has a tubular hub member 10 onto which four or any other suitable number of U-shaped wire spokes 11 are welded by their cross portions 12 as indicated at 13 preferably in equally circumferentially spaced relation around the hub. The spokes 11 are disposed in radial planes and the arms 14 of each spoke extend in outwardly diverging relation and have their outer ends 15 bent outwardly away from one another and welded as indicated at 16 to the inner circumference of circular wire rings 17 forming the rims of the drum. This makes for a light but, nevertheless, strong and durable, as well as economical construction and one which is at the same time attractive in appearance. The outwardly bent end of one of the arms 14 is extended as indicated at 18 to form a supporting spindle on which an operating knob or handle 19 may be mounted, the outer end of the handle 19 being counterbored so that a washer 21 and the upset head 22 provided on the end of the spindle 18 are enclosed within the end of the handle for neater appearance. The clothes line is, of course, wound in the channel 23 defined between the arms 14 of the several spokes 11, being suitably tied to one of them.

The handle bracket 6 comprises an attaching plate 24 that is flat on its upper and lower end portions 25 and 26 but stamped to a generally channel-shaped cross-section intermediate its ends to form a handle grip 27 by means of which the clothes line reel may be carried comfortably with one hand while the operator uses his other hand to wind the line on the drum 5 in walking from pulley to pulley in taking the line down. The handle bracket 6 also comprises a generally U-shaped sheet metal bracket 28, the cross portion 29 of which is in spaced parallel relation to the handle grip 27 and the arms 30 of which have outwardly bent end portions 31 welded or otherwise suitably secured to the opposite end portions 25 and 26 of the attaching plate 24. The axle 7 extends through a hole 32 in the cross-portion 29 of the bracket 28 and has a reduced end portion 33 entered in a hole 34 in the web portion of the handle grip 27 in alignment with the hole 32, the projecting end of the reduced end portion 33 being upset as indicated at 35 to permanently secure the parts together with the axle 7 extending from the bracket 28 substantially at right angles to the plane of its cross-portion 29. The spaced supports 32 and 34 for the axle insure the desired rigidity and this general arrangement at the same time affords a space for the operator's hand where it is satisfactorily protected against likelihood of any accidental injury by contact with the spokes of the drum. The axle 7 extends through the hub 10 and has its outer end upset as indicated at 36 to form a head against which a coiled compression spring 37 surrounding the projecting end of the axle has abutment at one end, the other end being disposed in abutment with the outer end of the hub 10. In that way, the drum 5 is urged inwardly toward the handle bracket 6 for a light frictional drag on the turning of the drum, it being important, as previously mentioned, to prevent spinning of the drum in the paying out of line, because that would be apt to cause the line to be dragged along the ground and be soiled. The cutting off of the hub 10 at a point inwardly spaced with respect to the outer ends of the cross-portions 12 of the spokes 11, as clearly appears in Fig. 1, results in the concealment of the spring 37 in the hub portion of the reel for neater appearance, without sacrificing good bearing support for the drum 5 on the axle 7, as will be readily apparent in Fig. 1.

The inner end of the hub 10 has a ratchet wheel 38 welded thereon, as indicated at 39, in concentric relation to the drum 5, and this ratchet wheel cooperates with a gravity type pawl 40 that is pivoted on a stud 41 on the bracket 28 to swing from the operative position shown in full lines in Fig. 2 to the retracted position indicated in dotted lines in Fig. 2 and shown also in full lines in Fig. 1. In the retracted inoperative position a curved sheet metal finger 42 that is welded or otherwise suitably secured to the outer end of the pawl and projects laterally inwardly is designed to rest on the flanged rim 43 of a sheet metal guard disk 44 when the pawl is in the retracted position. The disk 44 is welded or otherwise suitably secured to the outer side of the cross-portion 29 of the bracket 28 and has a segment 45 of approximately 60° angular extent bent inwardly into offset but substantially parallel relationship to the rest of the disk to provide a gap in the rim 43 through which the pawl 40 is adapted to project in its operative position as shown in Fig. 2. The pawl 40 is of stamped sheet metal construction and the outer end portion 46 thereof is disposed in a plane parallel to the outer side of the ratchet wheel 38, an edge portion being bent inwardly as indicated at 47 to form a tooth adapted to ride on the teeth 48 of the ratchet wheel 38 and lock the wheel and the drum 5 with it in an adjusted position, as when the reel is mounted on the supporting plate 8 and is used as a winch to tighten up the clothes line. The disk 44 being larger than the wheel 38 and having the outwardly projecting rim portion 43, serves to shield the operator's hand from likelihood of any accidental contact with the ratchet wheel so that there is no danger of getting a finger scratched or cut by the teeth of the ratchet wheel. The disk 44 also serves as a brake disk, the same having a circular rib 49 struck outwardly therefrom in concentric relation to the ratchet wheel 38 and arranged to rub against the back of the wheel for the frictional drag previously mentioned, the drum 5 being urged toward the disk 44 under pressure of the spring 37. The light frictional drag thus afforded, is sufficient to prevent spinning of the drum, and in that way, the line is kept off the ground in walking from pulley to pulley in putting up the line. The spring 37, of course, also keeps the ratchet wheel 38 in the proper relationship to the disk 44 and pawl 40 so that the disk performs its guard function, and the pawl serves to lock the drum releasably in adjusted position. When it is desired to swing the pawl 40 to retracted position, the pawl is easily taken hold of by the finger 42 and the pawl is kept in the retracted position while putting up the line, but is swung back to the operative position when the reel is mounted on the supporting plate 8 so that the pawl will run on the ratchet wheel as the drum is turned in a clockwise direction to tighten the line, the pawl tooth 47 engaging behind one of the teeth 48 to lock the drum in adjusted position.

The supporting plate 8 has a stud 50 on its lower end portion 26 of the attaching plate 24 on the handle bracket 6 for a quickly detachable connection between the plates 8 and 24 at that end, and there is a turn-button 52 pivoted on the shank of a stud 53 carried on the upper end portion of the plate 8 which is passable freely through a slot 54 in the upper end portion 25 of the plate 24 and is designed to be turned to a position at right angles to the slot as shown in Fig. 2 to lock the plates 8 and 24 together and thus fasten the reel securely to the post or building on which the plate 8 happens to be mounted. The flaring of the lower end of the slot 51 as indicated at 55 facilitates entering the stud 50 in the slot 51, and once the plate 24 has been connected to the supporting plate 8 at that point the operator is relieved of the weight of the reel and the only remaining detail to complete the mounting of the reel on the post or building is to pass the turn-button 52 through the slot 54 and then turn it.

It should be evident from the foregoing description that we have provided a clothes line reel of very practical and serviceable design and construction because it not only serves to store the line, but also as a line tightener, without, however, necessitating leaving the device outdoors where the line would get dirty and the device would in time get rusty and unsightly and contribute to the further soiling of the line.

Referring to Figs. 3 and 4, showing pulleys 56 mounted on hangers 57, these pulleys are preferably hung on the hooks provided on the posts or buildings where the line is to be strung so that they may be removed and taken into the house with the reel to eliminate danger of theft, and also, for protection against dirt, because any dirtying or rusting of these pulleys would necessarily result in soiling the line. The pulleys are numbered E1—E3 in Fig. 5 and are of an open-faced design, rotatable on studs 58 provided on the lower ends of the hangers 57, and a hole 59 is provided in the upper end of each hanger to receive the hook. Each pulley is formed from an inner ring 60 of relatively small diameter and an outer ring 61 of relatively large diameter so that a line entered in the annular groove 62 between the rings will not be apt to slip out in the stringing of the line from post to post or building to building, as the case may be. After the line has been strung over all of the pulleys the line is then tightened in the manner previously described and this causes all of the hangers to swing outwardly on their hooks to a certain extent, but there is no danger of the line coming off one of the pulleys, because it is hooked behind the larger outer flanges of the pulleys. The rings 60 and 61 defining the flanges of the pulleys are preferably stamped from sheet metal for lightness and economy as well as durability and each of the rings is formed with an annularly flanged hub portion 63 designed to turn on the stud 58. The bell shape of the rim portions 64 has the double advantage of contributing strength and rigidity, and eliminating raw edges which would cut or scrape the line.

It is believed the foregoing description conveys a good understanding of the objects and advantages of our inventon. The appended claims have been drawn to cover all legitimate modifications and adaptations.

We claim:

1. A winding drum comprising a hub member, a plurality of wire spokes bent to U-shape and affixed by their cross-portions to the hub member in circumferentially spaced relation, the cross-portions being in substantially parallel relation to one another and the arms of each U-shaped spoke extending substantially radially outwardly from said hub member, and rings attached to the outer ends of the arms forming rims for said drum.

2. A winding drum comprising a hub member, a plurality of wire spokes bent to U-shape and affixed by their cross portions to the hub member in circumferentially spaced relation, the cross portions being in substantially parallel relation to one another and the arms of each U-shaped spoke extending substantially radially outwardly from said hub member, the outer ends of the arms of each U-shaped spoke being bent outwardly away from one another, and wire rings encircling said outwardly bent end portions and affixed thereto so that said end portions engage the inner circumference of said rings.

3. A winding drum comprising a hub member, a plurality of wire spokes bent to U-shape and affixed by their cross-portions to the hub member in circumferentially spaced relation, the cross-portions being in substantially parallel relation to one another and the arms of each U-shaped spoke extending substantially radially outwardly from said hub member, the outer ends of the arms of each U-shaped spoke being bent outwardly away from one another, and rings affixed to said outwardly bent end portion to form rims for said drum, one of the outwardly bent end portions being extended to form a spindle for a handle for turning the drum.

4. A winding drum comprising a hub member, a plurality of wire spokes bent to U-shape and affixed by their cross-portions to the hub member in circumferentially spaced relation, the cross-portions being in substantially parallel relation to one another and the arms of each U-shaped spoke extending substantially radially outwardly from said hub member, the outer ends of the arms of each U-shaped spoke being bent outwardly away from one another, rings affixed to said outwardly bent end portions to form rims for said drum, one of the outwardly bent end portions being extended to form a spindle for a handle for turning the drum, and a handle rotatably mounted on said spindle.

5. A reel comprising, in combination, an elongated supporting plate designed for application to a post or building, a winding drum, an elongated carrying handle having an axle extending therefrom substantially at right angles thereto on which said drum is rotatably mounted, quickly detachable connecting means on the ends of said handle and said supporting plate whereby said handle carrying said drum may be demountably supported on said plate, a handle on said drum in radially spaced substantially parallel relation to said axle for turning the same relative to the carrying handle, a ratchet wheel on said drum concentric with the axle, and a pawl on said carrying handle for engagement with said ratchet wheel.

6. A reel as set forth in claim 5, including portions on the drum and handle slidably engaging one another for a friction braking action for resisting turning of the drum relative to said carrying handle, and spring means normally urging said drum toward the handle to hold said slidably engaging portions yieldingly engaged.

7. A reel as set forth in claim 5, wherein the carrying handle comprises a hand grip portion and another portion spaced from the hand grip portion and disposed adjacent the ratchet wheel, said reel including a guard disk mounted on the latter portion of said carrying handle of larger diameter than said ratchet wheel and concentric with the axle and ratchet wheel to protect the operator's hand grasping the hand grip portion.

8. A reel as set forth in claim 5, wherein the carrying handle comprises a hand grip portion and another portion spaced from the hand grip portion and disposed adjacent the ratchet wheel, said reel including a guard disk mounted on the latter portion of said carrying handle of larger diameter than said ratchet wheel and concentric with the axle and ratchet wheel to protect the operator's hand grasping the hand grip portion, said disk and ratchet wheel having portions frictionally engaging one another for a braking effect, and said reel including spring means normally urging said drum toward said carrying handle so as to maintain said ratchet wheel and disk in frictional engagement.

9. A reel comprising, in combination, a support designed for application to a post or building, a winding drum, a carrying handle on which said drum is rotatably mounted, quickly detachable connecting means on said handle and on said support whereby said handle carrying said drum may be demountably supported on said support, a handle on said drum for turning the same relative to the carrying handle, a ratchet wheel on said drum, a pawl on said carrying handle for engagement with said ratchet wheel, the carrying handle comprising a hand grip portion and another portion spaced from the hand grip portion and disposed adjacent the ratchet wheel, and a guard disk mounted on the latter portion of said carrying handle of larger diameter than said ratchet wheel to protect the operator's hand grasping the hand grip portion, said pawl being of a gravity type and being designed when swung in one direction to engage the ratchet wheel and when swung in the opposite direction to engage the rim of said disk.

10. A reel comprising, in combination, a support designed for application to a post or building, a winding drum, a carrying handle on which said drum is rotatably mounted, quickly detachable connecting means on said handle and on said support whereby said handle carrying said drum may be demountably supported on said support, a handle on said drum for turning the same relative to the carrying handle, a ratchet wheel on said drum, a pawl on said carrying handle for engagement with said ratchet wheel, the carrying handle comprising a hand grip portion and another portion spaced from the hand grip portion and disposed adjacent the ratchet wheel, and a guard disk mounted on the latter portion of said carrying handle of larger diameter than said ratchet wheel to protect the operator's hand grasping the hand grip portion, said pawl being of a gravity type and being designed when swung in one direction to engage the ratchet wheel and when swung in the opposite direction to engage the rim of said disk, said disk having its rim portion bent outwardly to enclose said ratchet wheel, one portion of said disk being formed to provide a gap in said rim for extension therethrough of said pawl for engagement with said ratchet wheel.

11. A reel comprising a winding drum having a tubular hub portion, a carrying handle comprising a hand grip portion and an outer portion in fixedly spaced substantially parallel relation to the hand grip portion, an axle on which said drum is rotatably mounted by means of its hub member having an end portion extending through and supported in registering holes provided in the aforesaid two portions of said carrying handle and secured to said handle, a handle on said drum for turning the same, a ratchet wheel on said hub member adjacent the outer portion of said carrying handle, a guard disk of larger diameter than said ratchet wheel disposed in concentric relation thereto and secured to the outer portion of said carrying handle to protect the operator's hand grasping the hand grip portion of said carrying handle, and a gravity pawl pivoted on the outer portion of said carrying handle and movable in one direction toward engagement with the ratchet wheel and movable in the opposite direction to an inoperative position engaging the rim portion of said guard disk.

12. A reel comprising a winding drum having a tubular hub portion, a carrying handle comprising a hand grip portion and an outer portion in fixedly spaced substantially parallel relation to the hand grip portion, an axle on which said drum is rotatably mounted by means of its hub member having an end portion extending through and supported in registering holes provided in the aforesaid two portions of said carrying handle and secured to said handle, a handle on said drum for turning the same, a ratchet wheel on said hub member adjacent the outer portion of said carrying handle, a guard disk of larger diameter than said ratchet wheel disposed in concentric relation thereto and secured to the outer portion of said carrying handle to protect the operator's hand grasping the hand grip portion of said carrying handle, and a gravity pawl pivoted on the outer portion of said carrying handle and movable in one direction toward engagement with the ratchet wheel and movable in the opposite direction to an inoperative position engaging the rim portion of said guard disk, said guard disk having its rim portion bent outwardly to enclose the ratchet wheel and said disk being formed to provide a gap in said rim portion for extension therethrough of said pawl to engage said ratchet wheel.

13. A reel comprising a winding drum having a tubular hub portion, a carrying handle comprising a hand grip portion and an outer portion in fixedly spaced substantially parallel relation to the hand grip portion, an axle on which said drum is rotatably mounted by means of its hub member having an end portion extending through and supported in registering holes provided in the aforesaid two portions of said carrying handle and secured to said handle, a handle on said drum for turning the same, a ratchet wheel on said hub member adjacent the outer portion of said carrying handle, a guard disk of larger diameter than said ratchet wheel disposed in concentric relation thereto and secured to the outer portion of said carrying handle to protect the operator's hand grasping the hand grip portion of said carrying handle, a gravity pawl pivoted on the outer portion of said carrying handle and movable in one direction toward engagement with the ratchet wheel and movable in the opposite direction to an inoperative position engaging the rim portion of said guard disk, said disk and ratchet wheel having portions slidably engaging one another for a friction braking action to resist turning of said drum, and spring means normally urging said drum toward said handle to maintain said ratchet wheel and disk in frictional engagement.

14. A winding drum comprising a hub member, a plurality of wire spokes bent to U-shape and affixed by their cross-portions to the hub member in circumferentially spaced relation, the cross-portions being in substantially parallel relation to one another and the arms of each U-shaped spoke extending substantially radially outwardly from said hub member, and rings attached to the outer ends of the arms forming rims for said drum, the outer end of at least one of the arms of a U-shaped spoke being bent outwardly and forming a spindle projecting from the side of the drum to serve as a handle for turning the drum.

15. A winding drum comprising a hub member, a plurality of wire spokes bent to U-shape and affixed by their cross-portions to the hub member in circumferentially spaced relation, the cross-portions being in substantially parallel relation to one another and the arms of each U-shaped spoke extending substantially radially outwardly from said hub member, rings attached to the outer ends of the arms forming rims for said drum, the outer end of at least one of the arms of a U-shaped spoke being bent outwardly and forming a spindle projecting from the side of the drum to serve as a handle for turning the drum, and a handle rotatably mounted on said spindle.

16. A reel comprising a winding drum having a tubular hub portion, a carrying handle comprising an elongated hand grip portion and an elongated outer portion in fixedly spaced substantially parallel relation to the hand grip portion, an axle carried by and projecting from the outer portion of said handle substantially at right angles thereto and rotatably supporting said drum by means of its hub member, a handle on said drum for turning the same, a ratchet wheel on said hub member adjacent the outer portion of said carrying handle, a guard disk of larger diameter than said ratchet wheel disposed in concentric relation thereto and secured to the outer portion of said carrying handle to protect the operator's hand grasping the hand grip portion of said carrying handle, and a gravity pawl pivoted on the outer portion of said carrying handle and movable in one direction toward engagement with the ratchet wheel and movable in the opposite direction to an inoperative position engaging the rim portion of said guard disk.

17. A reel comprising a winding drum having a tubular hub portion, a carrying handle comprising an elongated hand grip portion and an elongated outer portion in fixedly spaced substantially parallel relation to the hand grip portion, an axle carried by and projecting from the outer portion of said handle substantially at right angles thereto and rotatably supporting said drum by means of its hub member, a handle on said drum for turning the same, a ratchet wheel on said hub member adjacent the outer portion of said carrying handle, a guard disk of larger diameter than said ratchet wheel disposed in concentric relation thereto and secured to the outer portion of said carrying handle to protect the operator's hand grasping the hand grip portion of said carrying handle, a gravity pawl pivoted on the outer portion of said carrying handle and movable in one direction toward engagement with the ratchet wheel and movable in the opposite direction to an inoperative position engaging the rim portion of said guard disk, said guard disk having its rim portion bent outwardly to enclose the ratchet wheel and said disk being formed to provide a gap in said rim portion for extension therethrough of said pawl to engage said ratchet wheel.

18. A reel comprising a winding drum having a tubular hub portion, a carrying handle comprising an elongated hand grip portion and an elongated outer portion in fixedly spaced substantially parallel relation to the hand grip portion, an axle carried by and projecting from the outer portion of said handle substantially at right angles thereto and rotatably supporting said drum by means of its hub member, a handle on said drum for turning the same, a ratchet wheel on said hub member adjacent the outer portion of said carrying handle, a guard disk of larger diameter than said ratchet wheel disposed in concentric relation thereto and secured to the outer portion of said carrying handle to protect the operator's hand grasping the hand grip portion of said carrying handle, a gravity pawl pivoted on the outer portion of said carrying handle and movable in one direction toward engagement with the ratchet wheel and movable in the opposite direction to an inoperative position engaging the rim portion of said guard disk, said disk and ratchet wheel having portions slidably engaging one another for a friction braking action to resist turning of said drum, and spring means normally urging said drum toward said handle to maintain said ratchet wheel and disk in frictional engagement.

19. A reel comprising a winding drum having a tubular hub portion, a carrying handle comprising an elongated hand grip portion and an elongated outer portion in fixedly spaced substantially parallel relation to the hand grip portion, an axle carried by and projecting from the outer portion of said handle substantially at right angles thereto and rotatably supporting said drum by means of its hub member, a handle on said drum for turning the same, a ratchet wheel on said hub member adjacent the outer portion of said carrying handle a guard disk of larger diameter than said ratchet wheel disposed in concentric relation thereto and secured to the outer portion of said carrying handle to protect the operator's hand grasping the hand grip portion of said carrying handle, a gravity pawl pivoted on the outer portion of said carrying handle and movable in one direction toward engagement with the ratchet wheel and movable in the opposite direction to an inoperative position engaging the rim portion of said guard disk, and means for demountably supporting said reel on a post or building, comprising an elongated attaching plate of approximately the same length as the hand grip portion of said handle and means for quickly detachably connecting the ends of said hand grip portion to the end of said plate.

20. A reel comprising a winding drum having a tubular hub portion, a carrying handle comprising an elongated hand grip portion and an elongated outer portion in fixedly spaced substantially parallel relation to the hand grip portion, an axle carried by and projecting from the outer portion of said handle substantially at right angles thereto and rotatably supporting said drum by means of its hub member, a handle on said drum for turning the same, a ratchet wheel on said hub member adjacent the outer portion of said carrying handle, a guard disk of larger diameter than said ratchet wheel disposed in concentric relation thereto and secured to the outer portion of said carrying handle to protect the operator's hand grasping the hand grip portion of said carrying handle, a gravity pawl pivoted on the outer portion of said carrying handle and movable in one direction toward engagement with the ratchet wheel and movable in the opposite direction to an inoperative position engaging the rim portion of said guard disk, said disk and ratchet wheel having portions slidably engaging one another for a friction braking action to resist turning of said drum, spring means normally urging said drum toward said handle to maintain said ratchet wheel and disk in frictional engagement, and means for demountably supporting said reel on a post or building, comprising an elongated attaching plate of approximately the same length as the hand grip portion of said handle and means for quickly detachably connecting the ends of said hand grip portion to the end of said plate.

JAMES T. ATWOOD.
AGNAR JOHNSON.

REFERENCES CITED

The following references are of record in the file of this patent:

UNITED STATES PATENTS

| Number | Name | Date |
|---|---|---|
| 109,318 | Holman | Nov. 15, 1870 |
| 514,104 | Wickey | Feb. 6, 1894 |
| 673,907 | Johnson | May 14, 1901 |
| 775,931 | Ott | Nov. 29, 1904 |
| 973,266 | Eiche | Oct. 18, 1910 |
| 1,540,836 | Hedderich | June 9, 1925 |
| 1,814,389 | Jacobsen | July 14, 1931 |
| 2,078,081 | Kramer | Apr. 20, 1937 |
| 2,168,675 | Lofgren et al. | Aug. 8, 1939 |

FOREIGN PATENTS

| Number | Country | Date |
|---|---|---|
| 554 | Great Britain | 1895 |
| 151,096 | Great Britain | Sept. 20, 1920 |